United States Patent
Steinle et al.

(10) Patent No.: US 6,172,772 B1
(45) Date of Patent: Jan. 9, 2001

(54) IMAGE SCANNER WITH COMPENSATION FOR MAGNIFICATION CHANGES

(75) Inventors: Michael J. Steinle, Fort Collins; Dan S. Johnson, Greeley, both of CO (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/127,776

(22) Filed: Jul. 31, 1998

(51) Int. Cl.[7] .................................................. H04N 1/00
(52) U.S. Cl. ............................................ 358/406; 358/471
(58) Field of Search ................................... 358/406, 482, 358/483, 504, 471, 474; 382/274; 250/208.1

(56) References Cited

U.S. PATENT DOCUMENTS

| 5,285,293 | 2/1994 | Webb et al. | 358/471 |
| 5,309,205 * | 5/1994 | Hayano | 355/243 |
| 5,583,645 * | 12/1996 | Vegais et al. | 358/296 |
| 5,604,601 * | 2/1997 | Edgar et al. | 358/302 |
| 5,608,538 * | 3/1997 | Edgar et al. | 358/406 |

\* cited by examiner

Primary Examiner—Cheukfan Lee
(74) Attorney, Agent, or Firm—Augustus W. Winfield (57) ABSTRACT

A process for compensation for real time changes of magnification in an optics system for an image scanner. Targets having high-contrast edges, on both sides of an image to be scanned, are scanned along with the image. If magnification changes, the number of pixels between the targets may change. The pixels between the targets are filtered to generate a fixed number of pixels. Photosensor sensitivity compensation values may be separated into factory compensation values and scanner pre-scan compensation values. Factory compensation values are applied before filtering. Differences between factory compensation values and pre-scan compensation values are applied after filtering.

6 Claims, 6 Drawing Sheets

IMAGE SCANNER WITH COMPENSATION FOR MAGNIFICATION CHANGES

FIELD OF INVENTION

This invention relates generally to image scanning devices such as copiers, facsimile machines, and scanners for computers, and more specifically to compensation for real time changes in magnification of an optical system used by an image scanner.

BACKGROUND OF THE INVENTION

Image scanners convert a visible image on a document or photograph, or an image in a transparent medium, into an electronic form suitable for copying, storing or processing by a computer. An image scanner may be a separate device or an image scanner may be a part of a copier, part of a facsimile machine, or part of a multipurpose device. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example a photographic positive slide, through an optics system, and then onto an array of photosensitive devices.

In general, there is need for reducing the cost of an image scanner. One expensive component is the optics system used to focus a line on a document onto an array of photosensors. However, some low cost lens designs are sensitive to environmental changes, particularly temperature and mechanical movement. In particular, some low cost plastic lenses are more sensitive to temperature than more expensive optical glass lenses. It is common for an image scanner to include a lamp that radiates substantial heat. Copiers and multipurpose devices may also include heaters for fusing toner onto paper or for drying ink. Before scanning is requested, lamps and heaters may be off or in a low-power standby condition. During scanning, the internal temperature of the image scanner may change substantially. In addition, it is common to move the optics system of a scanner during a scan. With changing temperature, and mechanical movement, the magnification of an optics system may change slightly during a scan. If magnification changes during a scan, lines or edges, parallel to the direction of scanning, that are straight in the image on the document may appear curved in the resulting scanned image.

Scanners typically use linear arrays of photosensors. Sensitivity varies from photosensor to photosensor. It is common to calibrate the sensitivity of each individual photosensor before scanning by scanning a calibration strip having a uniform reflectance. This calibration also compensates for non-uniform illumination, and may also compensate for small obstructions or imperfections in the optical path, such as dust or a fingerprint on a lens or mirror. Assume, for example, that a small group of individual photosensors receives light during pre-scan calibration that is partially obscured by a dust particle on a lens. If magnification changes, the group of photosensors affected by the dust particle changes. An individual photosensor that was properly calibrated before scanning may be inappropriately calibrated after magnification changes. As a result, streaks may appear in the resulting scanned image.

There is a need for real time detection of and compensation for magnification change.

SUMMARY OF THE INVENTION

An array of photosensors includes photosensors that receive light from areas that are outside the image line being scanned. A magnification compensation target, having a straight high-contrast edge or pattern boundary parallel to the direction of scanning, is provided along the edges of the image being scanned. The magnification compensation target may be any detectable step in reflectance or intensity, such as a black edge on a white background, or an opaque obstruction that blocks light received by the photosensors. Preferably, the system has a predefined number N where N is the expected number of photosensors receiving light between the two magnification compensation targets at a nominal scanning temperature. Alternatively, the number N may be determined during a pre-scan calibration procedure, or some other time before scanning. The effective photosensor locations of the steps in intensity, resulting from scanning the magnification compensation targets, are monitored during the scan. If the photosensor locations of the steps in intensity change, then data from the photosensors is filtered (decimated/interpolated) to provide a constant number (N) of pixels.

Part of the sensitivity compensation data is a function of individual photosensors and part of the sensitivity compensation data may need to be applied to different photosensors if magnification changes. One (example solution is to calibrate photosensor array sensitivity before a scanner is assembled and to store the resulting sensitivity compensation data in a non-volatile memory that stays with the corresponding photosensor array in the assembled product. Then, the photosensor array may be calibrated again just before scanning, and any differences between factory compensation data and pre-scan compensation data may be applied to the N pixels that result from digital filtering.

DETAILED DESCRIPTION OF THE PREFERRED EMBODIMENT OF THE INVENTION

Figure 1:
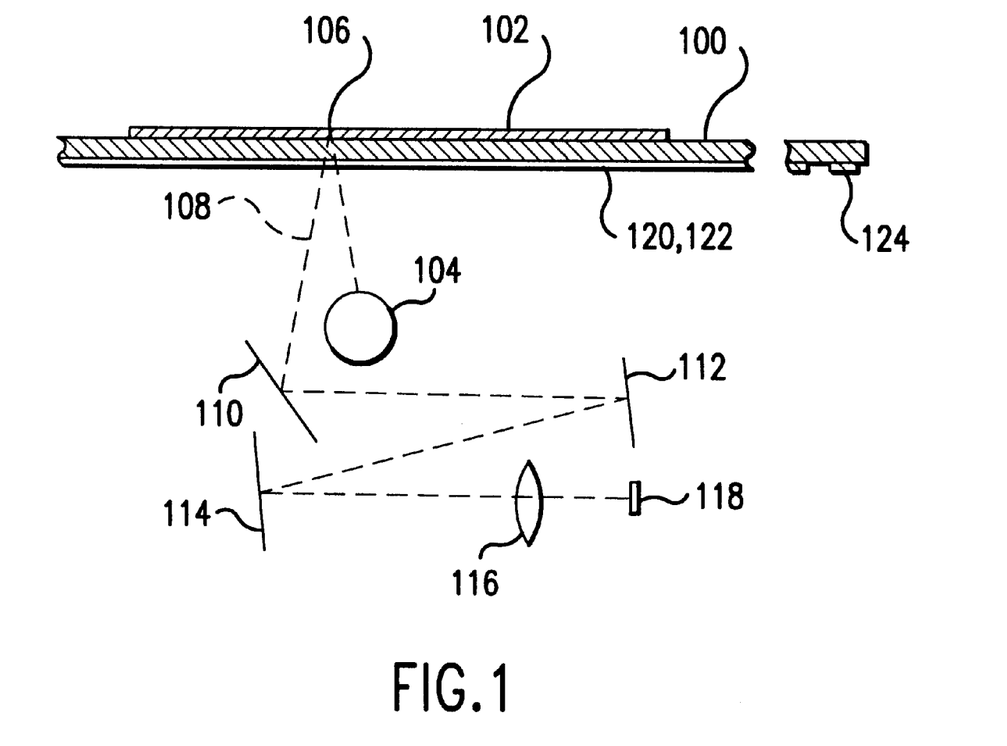
FIG. 1 is a simplified side view of a scanner with magnification calibration targets in accordance with the invention.

FIG. 1 illustrates an example scanner using a lens system to reduce a line image onto a sensor array. In FIG. 1, a scanner includes a transparent platen 100. A document 102 is placed face down onto the platen 100 for scanning. A lamp 104 illuminates a line 106 on the face of the document 102. Dashed line 108 depicts the path of a light ray. Light ray 108 is reflected by three mirrors (110, 112, and 114) and passes through a lens system 116 and onto a sensor array 118. The lamp, mirrors, lens, and sensor array may be contained in a carriage that moves relative to the document being scanned. The particular configuration depicted in FIG. 1 is intended to illustrate an example system. The mirrors are used in the example system to fold the light path to make the moving carriage smaller. However, for purposes of the invention, mirrors are not necessary. A reflective document scanner is used to illustrate an example embodiment. However, the invention is equally applicable to a scanner for transparent images.

Figure 2:
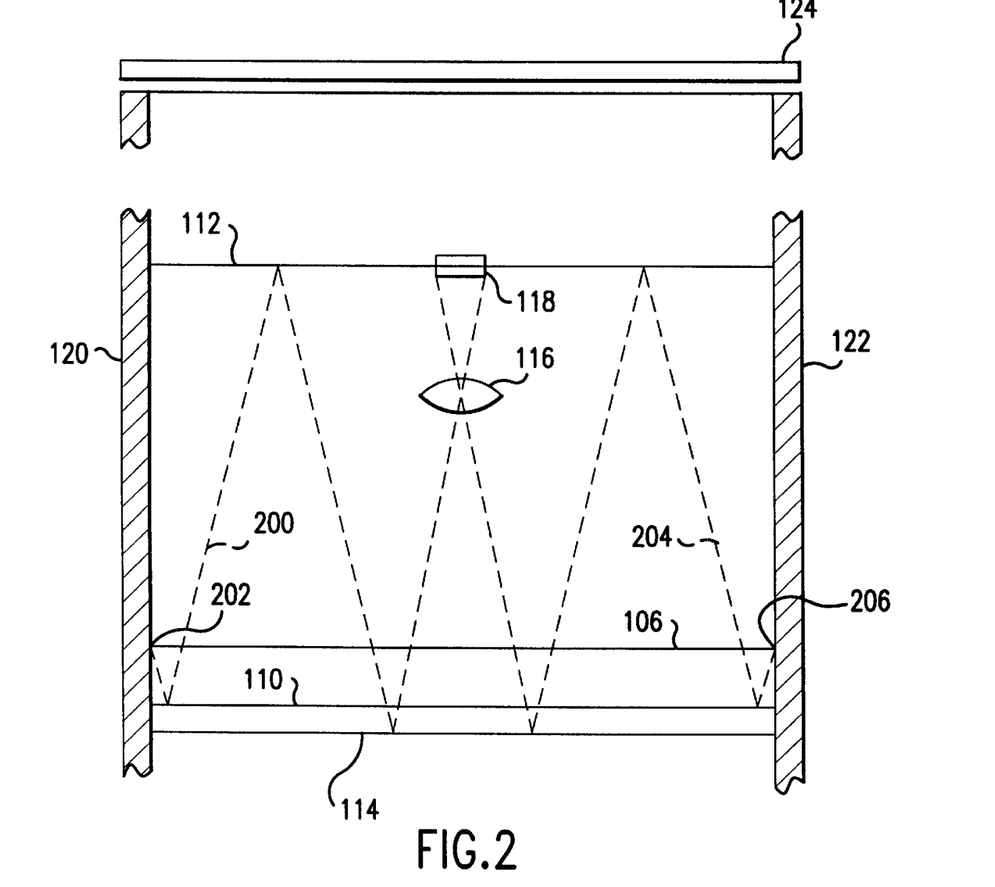
FIG. 2 is a simplified top view of the scanner of FIG. 1, as viewed just below the platen.

Also illustrated in FIG. 1 are magnification compensation targets 120 and 122 (illustrated separately in FIG. 2). Magnification compensation targets 120 and 122 are illustrated underneath the platen 100, but for purposes of the invention could also be placed on top of the platen, on top of the carriage, on one of the mirrors, or could be a separate component anywhere along the optical path between the scan line 106 and the sensor array 118. Also illustrated in FIG. 1 is a photosensor calibration target 124 used to calibrate the sensitivity of individual photosensors and also to compensate for non-uniform illumination. The location of the photosensor calibration target may also be different than the location illustrated in FIG. 1.

FIG. 2 illustrates a top view of the scanner of FIG. 1, as viewed with the document and platen removed. Lens 116 reduces an image having the width of the scan line 106 to an image having less than the width of a row of photosensors on the sensor array 118. In FIG. 2, two light rays (light ray 200 from edge 202 of magnification compensation target 120 and light ray 204 from edge 206 of magnification compensation target 122) are folded by the mirrors as depicted in FIG. 1 and are projected onto the sensor array 118. Light rays 200 and 204 follow the path depicted by line 108 in FIG. 1. During initial calibration, the scanner controller (not illustrated) first scans the photosensor calibration target 124, which has a known uniform reflectance. Preferably, the photosensor calibration target 124 extends beyond the inner edges of the magnification compensation targets (120, 122) as illustrated in FIG. 2. The magnification compensation targets have a step in reflectance (for example, white to black or black to white) parallel to the direction of scanning, with an accurate fixed spacing between the targets. This will be discussed in more detail below. The intensity of a lamp may change during a scan and it is known for a scanner to have an intensity calibration target along one edge of the platen. One or both of the magnification compensation targets (120, 122) may also serve as a lamp intensity calibration target.

Figure 3:
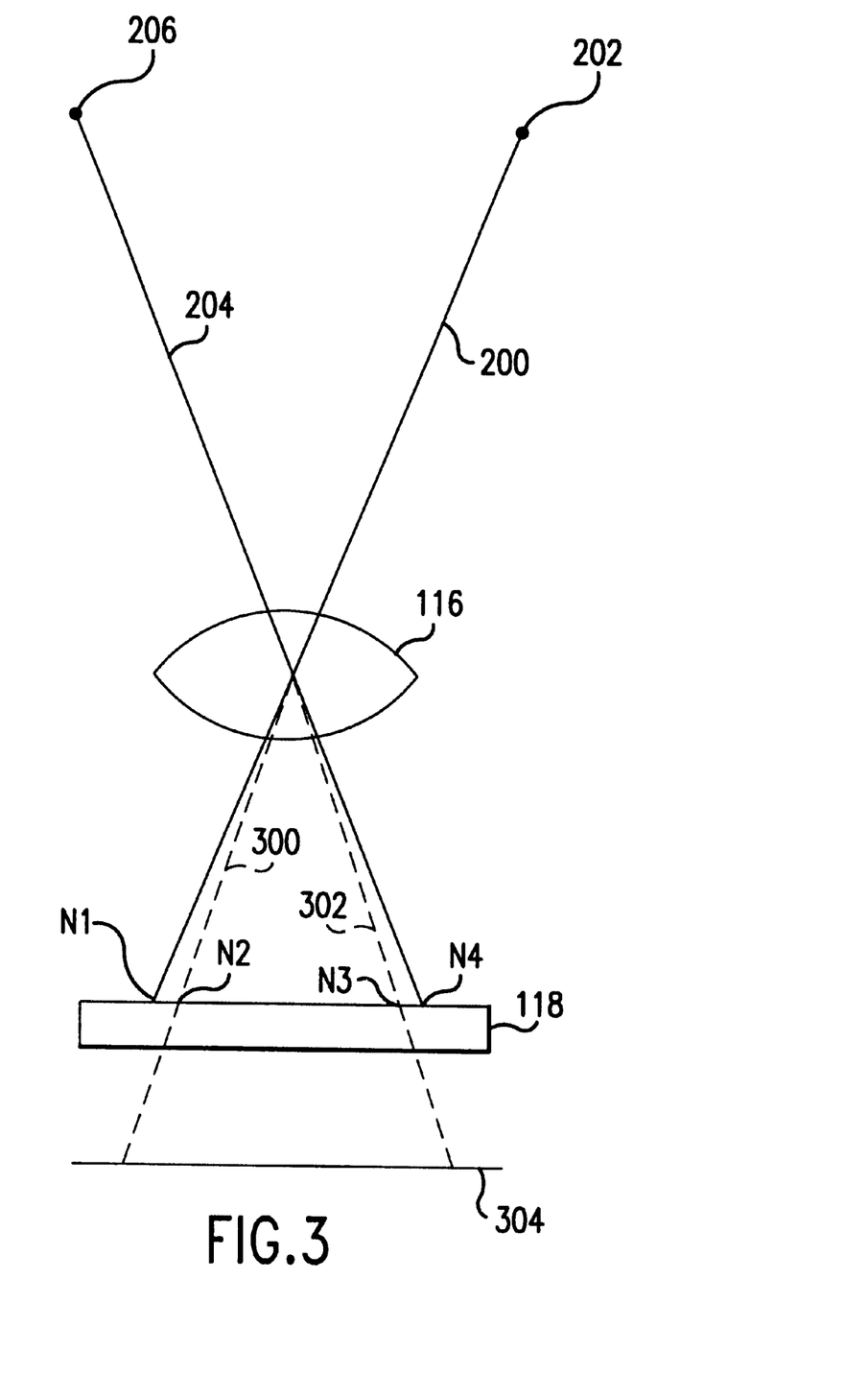
FIG. 3 is a simplified expanded top view of the lens and sensor array illustrated in FIGS. 1 and 2.

FIG. 3 illustrates an expanded top view of the lens 116 and sensor array 118. FIG. 3 depicts a mathematical model of a lens, and is not intended to represent actual ray tracing. In FIG. 3, the position of the image formed by the lens 116 is initially at the surface of the sensor array 118. During scanning, the scanner controller determines which individual photosensors correspond to the steps in intensity resulting from the magnification compensation targets 120 and 122 (FIGS. 1 and 2). Note that the step in intensity as detected at the photosensor array may be spread over several photosensors so that a midpoint or other thresholding process may be used to define a single photosensor as corresponding to a target edge. Assume that the individual photosensors in photosensor array 118 are sequentially numbered. In FIG. 3, light ray 200, which corresponds to one of the steps in intensity, projects onto photosensor N1. Likewise, light ray 204 projects onto photosensor N4. Assuming that N4 is greater than N1+1, the number of photosensors between N1 and N4 is N4−N1−1. That is, there are N4−N1−1 photosensors receiving information from an image on the document and all other photosensors are receiving light that is reflected by the magnification compensation targets or other internal parts of the scanner.

Ideally, for the image on the document along scan line 106, there is a one-to-one correspondence between native (optical) scanner pixels and photosensor elements. The image provided by the scanner to other devices may have an effective resolution that is different than the resolution corresponding to native (optical) pixels. The scanner controller, or a separate computer, may use digital filtering to reduce the number of pixels per unit of distance on the image (sometimes called decimation) (for example, to reduce storage and processing requirements), or the scanner controller or separate computer may use digital filtering to interpolate between scanner pixels to increase the number of pixels per unit of distance on the image. In the invention, digital filtering may be used to provide a fixed number of scanner pixels, and as a result, there may not be a one-to-one correspondence between scanner pixels and photosensor elements.

In FIG. 3, the magnification of the lens 116 is affected by the radii of the lens, the thickness of the lens, the index of refraction of the lens, and the position of the lens (object distance). All four parameters may change with temperature and humidity, but the dominant change is the change in the index of refraction with temperature. Typically, for glass, the index of refraction increases with increasing temperature, and for plastic the index of refraction decreases with increasing temperature. In the simple lens of FIG. 3, if the index of refraction decreases with increasing temperature, light rays are bent less, so that light ray 200 is bent as depicted by line 300, and light ray 204 is bent as depicted by light ray 302. With increasing temperature, the focal length increases, causing a larger image to be formed behind the sensor array, as indicated by line 304. If the photosensor array could be moved to line 304, the net result would be a larger image. However, if the photosensor array is stationary relative to the lens, a smaller out-of-focus image is formed at the surface of the photosensor array. The smaller image extends from photosensor N2 to photosensor N3. As a result of increasing temperature, the number of photosensors detecting light between the magnification compensation targets has decreased from (N4−N1−1) to (N3−N2−1). FIG. 3 depicts a simple single lens having a material with an index of refraction that decreases with temperature. In general, scanner optics systems have a complex series of elements, with both converging (positive) and diverging (negative) lens surfaces, such that the net result for an increase in temperature may be a decrease in magnification or may be an increase in magnification. When magnification changes, focal length also changes. However, systems can be made relatively insensitive to focal length changes (increasing the depth of field) by using small apertures, telocentric elements, or other well known optical techniques.

Preferably, the scanner system includes a predetermined number N, where N is equal to the expected number of photosensors receiving light between the steps in intensity of the magnification compensation targets at a nominal temperature. For example, N may the expected value of N4−N1−1. Alternatively, N may be determined during a pre-scan process by setting N=N4−N1−1 where N4 and N1 are determined before scanning or are determined for the first scanned line of the document image. In general, in the invention, if the number of scanner pixels (pixels illuminated by an image on the scan line between the magnification compensation targets) changes, then the scanner electronically filters the scanner pixels to generate an output of exactly N pixels throughout the scan.

As discussed above, during initial calibration, photosensor sensitivity calibration target 124 is used to calibrate the sensitivity of individual photosensors and also to compensate for non-uniform illumination. An example method of photosensor calibration is disclosed in U.S. Pat. No. 5,285, 293 (Webb et al.), which is incorporated herein for all that it teaches and discloses. The photosensor calibration target is designed to have a uniform reflectance. The scan line is placed onto the photosensor calibration target and intensity is measured by each individual photosensor. The analog outputs of individual photosensors may vary because of individual photosensor characteristics, or because the scanner lamp may provide non-uniform illumination on the photosensor calibration target, or because dust or other contamination may partially block light from the lamp, or because dust or other contamination may partially block reflected light from the calibration target. An amplifier gain may be adjusted, or other electronic signal path parameters may be adjusted, for the signal from each individual photosensor, so that the scanner provides the same digital intensity value for light reflected from the photosensor calibration target for each individual photosensor, even though actual photosensor outputs vary.

In Webb et al., digital compensation values are assigned to individual photosensors. However, if the light path is partially blocked, for example by dust, and if scanner pixels are digitally filtered (decimated or interpolated) to generate a different number of output pixels, then an undesirable streaking may occur in the final image. Consider a dust particle, for example on a mirror, that partially blocks light to a single photosensor number X during initial calibration. A compensation value is assigned to photosensor X so that the analog signal from photosensor X is appropriately modified. If magnification changes, then the dust particle may then block light to some other photosensor, for example photosensor X+1, and the compensation value assigned to photosensor X, and the compensation value assigned to photosensor X+1, are both inappropriate, possibly resulting in a visible anomaly in the resulting image.

Assume in the above example that photosensor X is inherently more sensitive than photosensor X+1. This inherent photosensor sensitivity difference does not change when lens magnification changes. Therefore, compensation for sensitivity differences needs to remain associated with individual photosensors. However, as discussed above, compensation for illumination differences or light path obstruction may need to be a function of magnification. One solution is as follows. Sensitivity compensation for just the photosensor array may be determined as a factory calibration using a controlled uniform light source and a controlled dust free environment. These factory compensation values may then be stored into a non-volatile memory in the scanner. During normal scanner usage, the photosensor calibration target is used for a pre-scan calibration, and differences between factory compensation values and scanner pre-scan compensation values are separately recorded. The differences between factory compensation values and pre-scan compensation values are then applied to pixel values after digital filtering has generated N pixels. For each pixel, the overall compensation comprises the factory compensation value for one photosensor element combined with compensation differences applied to an appropriate pixel value after digital filtering. Note that the word "differences" does not mean literal subtraction. Typically, compensation values are used to electrically modify the gain of an amplifier. The overall compensation may then comprise modification of the gains of two amplifiers in series. The first gain modification compensates for inherent photosensor sensitivity and the second gain modification compensates for additional non-uniformity in the overall scanner system.

Figure 4:
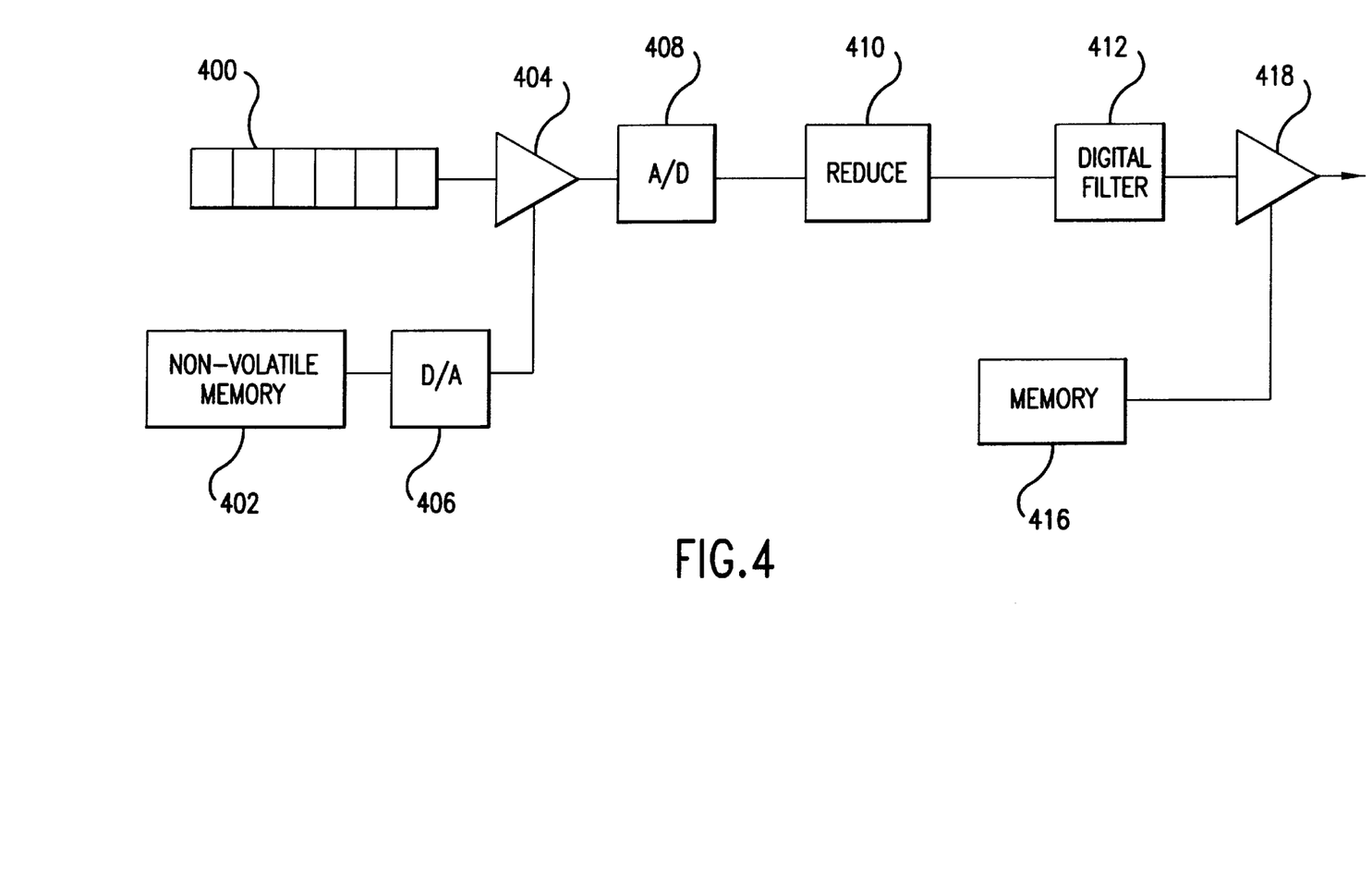
FIG. 4 is a block diagram of the signal processing for a system with magnification compensation in accordance with the invention.

FIG. 4 is a block diagram of an example system. Element 400 is a row of photosensors, for example, charge-coupled-devices. During factory calibration, sensitivity compensation values are stored in a non-volatile memory 402, with a one-to-one correspondence between values in memory 402 and individual photosensor elements in sensor array 400. Electric charges from the row of photosensors 400 are serially shifted into an amplifier 404. For each charge, the corresponding numerical entry in the non-volatile memory 402 is converted to a voltage or current by a digital-to-analog converter 406, and the resulting voltage or current is used to control the gain of amplifier 404. Sequential analog outputs from the amplifier 404 are digitized by an analog-to-digital (A/D) converter 408 into numerical values.

During scanning, the number of outputs corresponding to photosensor elements receiving light between the edges of the steps in reflectance on the magnification compensation targets is M, where M may be different than N (the number of pixels between the edges of the magnification compensation targets as determined during pre-scan). The sequential numerical outputs of A/D 408 are reduced (unwanted outputs are discarded) by element 410 to the relevant M outputs. M outputs from the A/D 408 are digitally filtered (decimated/interpolated) by digital filter 412 to produce N total numerical pixel values at the output of filter 412.

During initial pre-scan calibration within the scanner, pre-scan magnification compensation values are determined, and differences between the factory compensation values and the scanner pre-scan compensation values are stored in memory 416. N compensation difference values are saved in memory 416. If N is predetermined, and if the number of pre-scan pixels, corresponding to photosensor elements receiving light between the edges of the steps in reflectance on the magnification compensation targets, is different than N, then the pre-scan compensation pixels must be digitally filtered to generate N pixels and the compensation difference values saved in memory 416 are then based on the N resulting interpolated pixels. If N is a variable determined during pre-scan, then the compensation values saved in memory 416 are based on the N pre-scan pixels. The outputs of memory 416 are used to scale the outputs of filter 412 (depicted for purposes of illustration by an amplifier 418 but the values being scaled are digital).

Figure 5A:
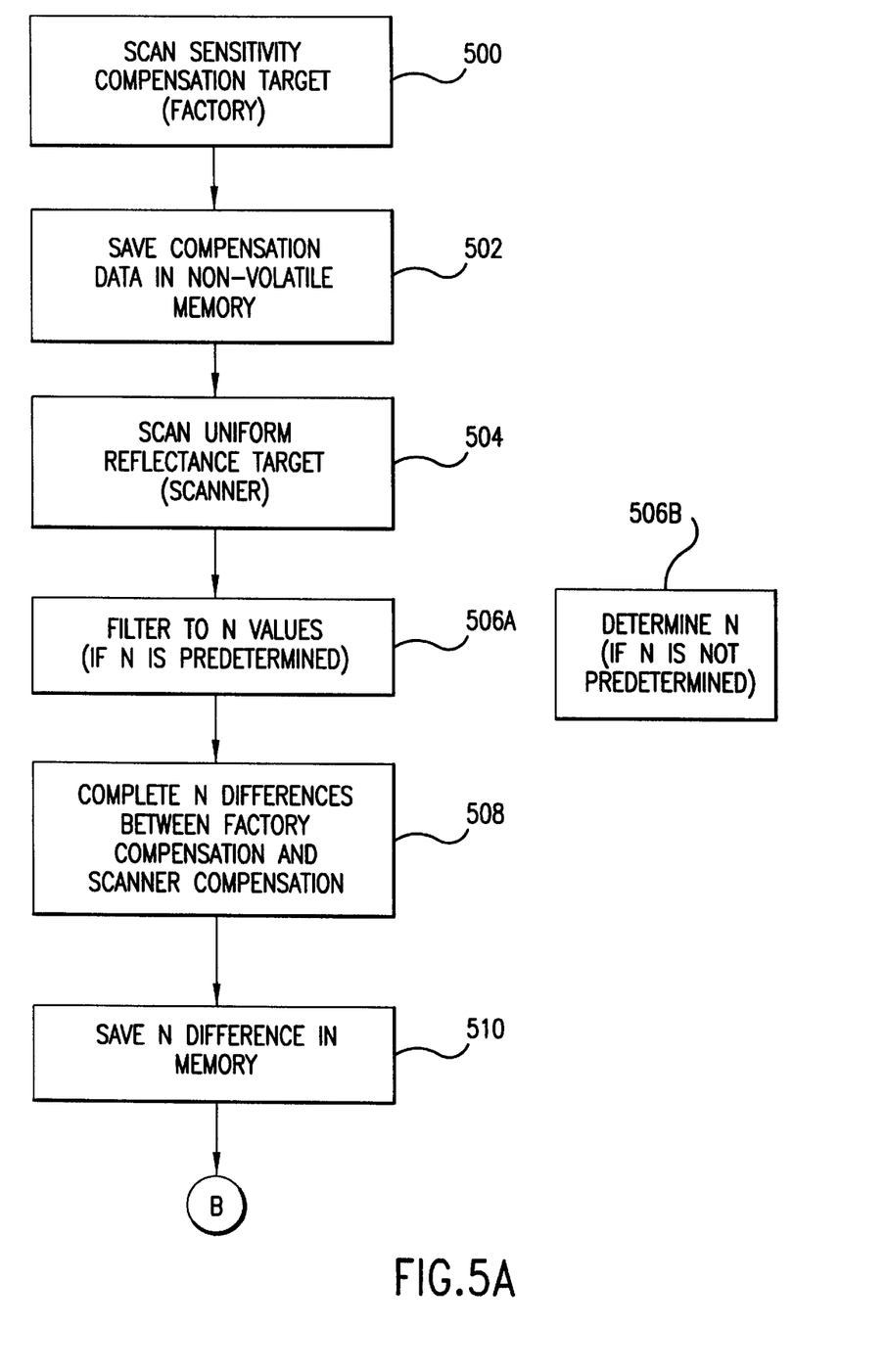
FIGS. 5A and 5B are a flow chart of a method of compensation for magnification change, in accordance with the invention.
Figure 5B:
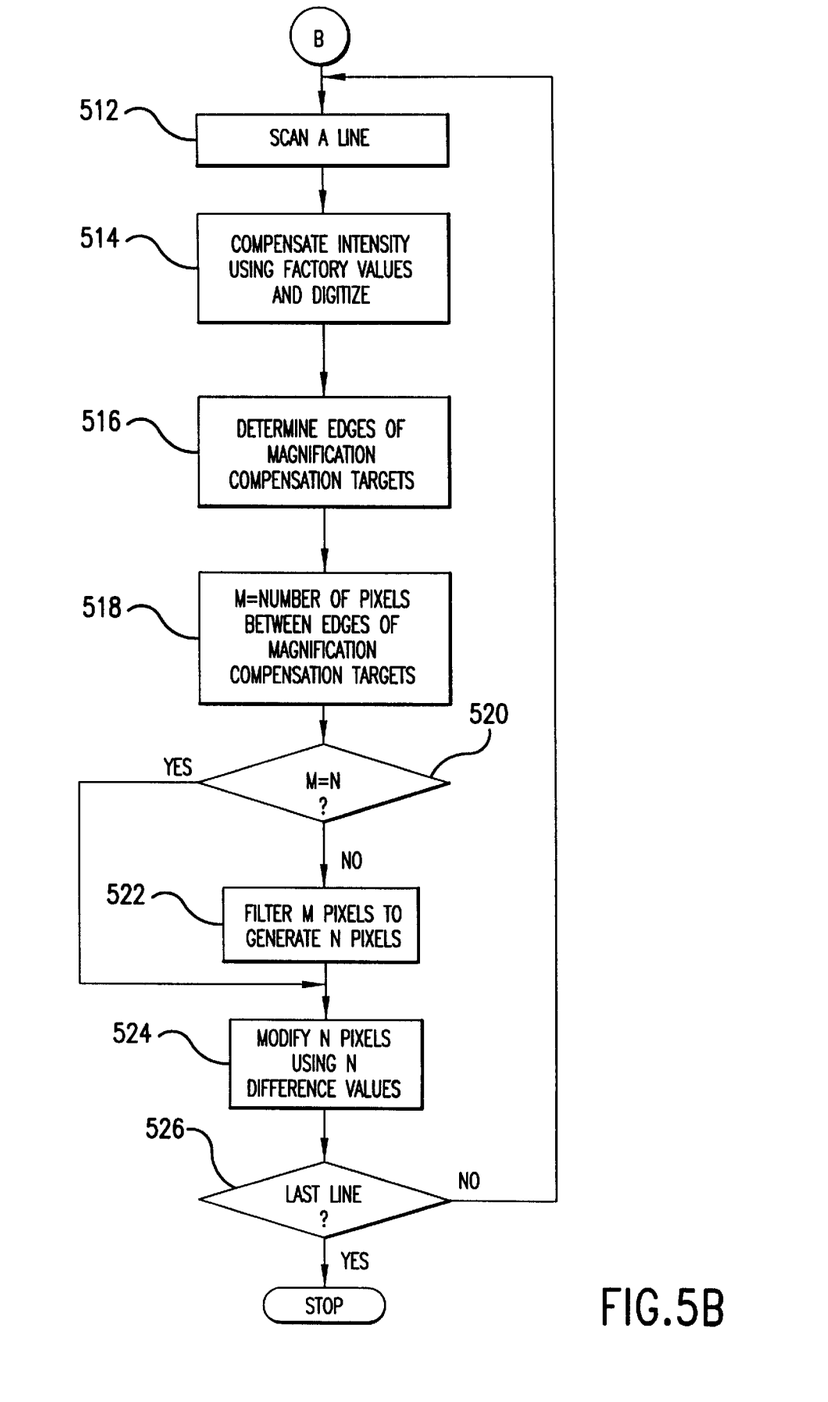

FIGS. 5A and 5B illustrate an example method for compensation for changes in magnification. At steps 500 and 502, a factory calibration is performed to determine sensitivity of individual photocells, and factory compensation values are stored in a non-volatile memory. At step 504, before scanning, the scanner scans a uniform reflectance target. If N is predetermined, the pre-scan pixels are filtered to generate N pixels before computing scanner calibration values (step 506A). If N is not predetermined, N must be determined (step 506B) by detecting the steps in intensity in the pixel data corresponding to steps in reflectance in the magnification compensation targets. Differences between resulting scanner compensation values and the original factory compensation values are stored in a memory (steps 508 and 510). In FIG. 5B, calibration is complete and scanning of an image on a document is performed. For each line scanned (step 512), the pixels are compensated by factory compensation values and the compensated pixels are digitized (step 514). Next, the number of pixels between the magnification compensation targets is determined (steps 516, 518). If the number is different than N (step 520), then the pixels are filtered (decimated/interpolated) (step 522). With or without filtering, the compensation differences are applied to N pixel values (step 524).

The foregoing description of the present invention has been presented for purposes of illustration and description.

It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A process for compensating image data in a scanner, in conjunction with a change in magnification, comprising the following steps:

determining first compensation values for a plurality of photosensor elements;

determining second compensation values for the plurality of photosensor elements, as part of a pre-scan calibration process;

computing differences between the first and second compensation values;

scanning a line of an image, generating pixel information;

applying the first compensation values to the pixel information;

scaling the pixel information, after the first compensation values have been applied, to result in a predetermined number of pixel values; and applying the differences to the scaled pixel information.

2. The process of claim 1, wherein the first compensation values are a function of photosensor sensitivity.

3. The process of claim 1, wherein the second compensation values are a function of photosensor sensitivity, illumination uniformity, and light path transparency.

4. The process of claim 1, wherein the differences are a function of variables other than photosensor sensitivity.

5. The process of claim 1, wherein scaling is performed by digital filtering.

6. The process of claim 1, wherein the first compensation values are stored in a nonvolatile memory in the scanner.

* * * * *